UNITED STATES PATENT OFFICE.

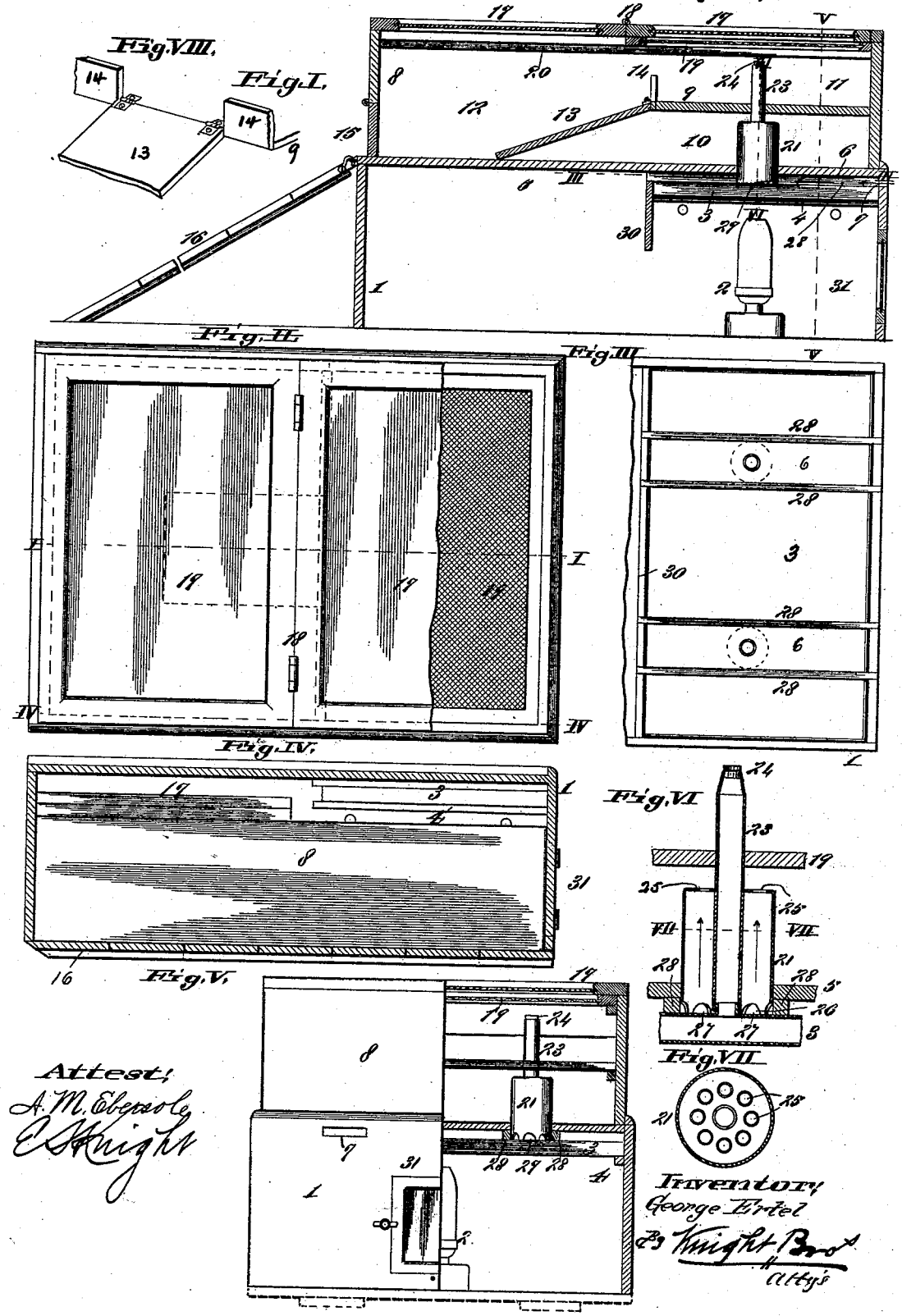

GEORGE ERTEL, OF QUINCY, ILLINOIS.

BROODER.

SPECIFICATION forming part of Letters Patent No. 501,775, dated July 18, 1893.

Application filed March 27, 1893. Serial No. 467,729. (No model.)

*To all whom it may concern:*

Be it known that I, GEORGE ERTEL, of Quincy, in the county of Adams and State of Illinois, have invented a certain new and useful Improvement in Brooders, of which the following is a full, clear, and exact description, reference being had to the accompanying drawings, forming part of this specification.

My invention relates to an improved brooder, to be used for the care of artificially hatched chickens; and my invention consists in features of novelty hereinafter fully described and pointed out in the claims.

Figure I is a vertical, longitudinal section of my improved brooder. Fig. II is a top view, with part of one of the folding doors broken away. Fig. III is a detail, horizontal section, taken on line III—III, Fig. I, but showing the heating drums in dotted lines only. Fig. IV is a longitudinal, vertical section, showing the parts in position for transportation, the section being taken on line IV—IV, Fig. II. Fig. V is part in end view, and part in vertical, transverse section, taken on line V—V, Fig. I. Fig. VI is an enlarged, vertical section, taken on line VI—VI, Fig. I. Fig. VII is a transverse section, taken on line VII—VII, Fig. VI. Fig. VIII is a detail, perspective view of the partition and run in the upper box.

Referring to the drawings, 1 represents a lower box containing a heating lamp 2, and a water tank 3, supported on cleats 4, or by other suitable means. This box 1 has a top 5, between which and the tank 3 there is an air passage 6, which extends through the end of the box, as shown at 7, Fig. I.

Over the box 1 is a second box 8, the bottom of which is formed by the top 5 of the box 1. The box 8 has a horizontal floor, or partition 9, about midway of its height, and which divides the box into a lower brooding chamber 10, and an upper brooding chamber 11. The floor or partition 9 does not extend the entire length of the box, providing a running chamber 12, the full height of the box.

The floor 9 is provided with a hinged run 13, which, when dropped into its lower position, as shown in Fig. I, provides a means for the chickens to pass from the running chamber into the upper brooding chamber, and the floor 9 is provided also with strips 14 to direct the chickens onto the run 13.

The end of the upper box next the chamber 12 is provided with a door 15, and by opening this door, the chickens are allowed to pass down a run 16 onto the ground.

The top of the box is provided with two glass doors 17, hinged together at 18, so that one may be folded onto the other, when it is desired to open either the chamber 12, or the brooding chamber 11 to the atmosphere.

19 represents a sliding screen, supported by strips 20, and which may be moved to cover the space of either one of the doors 17 which may be opened, and thus prevent the escape of the chickens, and protect them from their enemy.

21 is a bottomless drum located on the water tank 3, as shown in Fig. VI. Extending through the drum and communicating with the water tank is a pipe 23, the upper end of which I prefer to close with a cork 24, to keep steam from escaping into the brooding chambers. The drum 21 extends from the tank 3 into the brooding chamber 10, and the pipe 23 extends from the tank into the brooding chamber 11. The lower edge 26 of the drum is provided on one side with a number of openings 27 forming a communication between the space 6 and the interior of the drum, so that the fresh air passing through the opening 7 and the space 6, in which it is confined by cleats 28, enters the drum 21, and escapes into the lower brooding chamber through openings 25 in the top of the drum, from where a sufficient quantity of it can readily pass into the upper brooding chamber 11, and into the running chamber 12. There are no openings 27 on the inner, lower edge of the drum, and thus the fumes from the lamp cannot pass into the brooding chambers. The air, as it passes over the tank 3, and through the drum 21, is heated and enters the lower brooding chamber in a warm condition.

The tank 3 may be filled with water through the pipe 23, as will be readily seen from Fig. VI, and the pipe, which preferably has a tapered upper end, and the lower end of which is simply slipped over a collar on the tank, may be lifted out and inverted for filling the tank.

For transportation, the upper box 8 is placed in the lower box, as shown in Fig. IV, the doors 17 being preferably folded, one onto the other, and the run 16 may be placed on the bottom of the box 1, beneath the box 8, so that the whole device may be shipped and stored in a compact and convenient form.

There will be noticed in Fig. I, a vertical strip 30, at the inner end of the water tank, the function of this strip being to retain the heat from the lamp beneath the water tank, and this strip is not put in place until the device is set up for use, so that it does not interfere with storing the upper box within the lower box.

The drum 21 and pipe 23 are, as shown in Fig. VI, removable from the tank, so that in shipping the drum and the pipe can be stored in the box 1, with the other parts.

In shipping the run 16 is used as a bottom to the box 1, thus holding the box 8, and other parts within the box 1.

The lower box 1 may be provided with a door 31, through which the lamp 2 may be inserted, and removed.

I have shown the brooder provided with two drums 21, and pipes 23, but one or more may be used.

I claim as my invention—

1. In a brooder, the combination of the lower box, a lamp, and a water tank contained in said box, a drum resting on the tank, a pipe extending from the tank through said drum, and an upper box having a partition forming an upper and lower brooding chamber; said drum extending into said lower brooding chamber; and said pipe extending into said upper brooding chamber; substantially as and for the purpose set forth.

2. In a brooder, the combination of the lower box, a lamp, and a water tank contained in said box, said box having an air passage between its top and said water tank, a drum having a notched bottom and perforated top and resting on said water tank, a pipe mounted on said tank and extending through said drum, and an upper box divided into an upper and lower brooding chamber, said drum extending into said lower brooding chamber and communicating through said notches with said air passage between the top of the lower box and the water tank, and said pipe extending into the upper brooding chamber; substantially as and for the purpose set forth.

3. In a brooder, the combination of the lower box, a lamp and a water tank contained in said box, said box having an air passage between its top and said water tank, strips 28 forming the walls of said air passage, a drum having a perforated top and notches in its bottom on one side only, a pipe mounted on said tank and extending through said drum, and an upper box divided into an upper and lower brooding chamber, said drum extending from the tank into the said lower brooding chamber, and communicating through said notches with said air passage, and said pipe extending into the upper brooding chamber; substantially as and for the purpose set forth.

4. In a brooder, the combination of the lower box, a lamp and a water tank, contained in said box, an upper box having a partition extending part way only of the length of the box, a running board and strips secured to said partition, and means for conducting heat from said tank into the upper box; said upper box forming an upper and lower brooding chamber, and a running chamber; substantially as and for the purpose set forth.

5. In a brooder, the combination of the lower box, a lamp and a water tank contained in said box, an upper box having a partition forming a running chamber and an upper and lower brooding chamber, glass doors hinged together and forming the top of said box, and a sliding screen 19; substantially as and for the purpose set forth.

GEO. ERTEL.

In presence of—
GEO. H. KNIGHT,
E. S. KNIGHT.